United States Patent [19]
Dindi et al.

[11] Patent Number: 5,539,044
[45] Date of Patent: Jul. 23, 1996

[54] SLURRY DRAG REDUCER

[75] Inventors: Aysen Dindi; Ray L. Johnston; Yung N. Lee; Debora F. Massouda, all of Ponca City, Okla.

[73] Assignee: Conoco In., Del.

[21] Appl. No.: 300,615

[22] Filed: Sep. 2, 1994

[51] Int. Cl.$^6$ ................................................. C08L 23/18
[52] U.S. Cl. .......................... 524/570; 524/579; 524/309; 524/310; 524/315; 524/317; 524/416; 524/210; 524/43; 524/44; 524/47; 524/55; 524/56
[58] Field of Search .......................... 524/579, 587, 524/309, 570, 310, 315, 317, 416, 210, 43, 44, 47, 55, 54; 137/13

[56] References Cited

U.S. PATENT DOCUMENTS

| | | |
|---|---|---|
| 3,669,948 | 6/1972 | Konotsune et al. . |
| 3,692,676 | 9/1972 | Culter et al. . |
| 3,736,288 | 5/1973 | Stratta et al. . |
| 3,791,913 | 2/1974 | Strate et al. . |
| 3,884,252 | 5/1975 | Kruka . |
| 4,147,677 | 4/1979 | Lundberg et al. . |
| 4,190,069 | 2/1980 | Krantz ........................................ 137/13 |
| 4,212,312 | 7/1980 | Titus .......................................... 137/13 |
| 4,263,926 | 4/1981 | Drake et al. . |
| 4,340,076 | 7/1982 | Weitzen . |
| 4,358,572 | 11/1982 | Mack et al. . |
| 4,371,455 | 2/1983 | Mack et al. . |
| 4,384,089 | 5/1983 | Dehm . |
| 4,415,714 | 11/1983 | Mack . |
| 4,433,123 | 2/1984 | Mack . |
| 4,493,903 | 1/1985 | Mack . |
| 4,493,904 | 6/1985 | Mack . |
| 4,584,244 | 4/1986 | Fenton . |
| 4,720,397 | 1/1988 | O'Mara et al. . |
| 4,826,728 | 5/1989 | O'Mara et al. . |
| 4,837,249 | 6/1989 | O'Mara et al. . |
| 4,945,142 | 7/1990 | Gessell et al. . |
| 5,165,440 | 11/1992 | Johnston ..................................... 137/13 |
| 5,244,937 | 9/1993 | Lee et al. ................................... 524/451 |

FOREIGN PATENT DOCUMENTS 901727  5/1972  Canada .

OTHER PUBLICATIONS

B. M. Grieveson, Kinetics of the Polymerization of Ethylene with a Ziegler–Natta Catalyst, *Die Makromolekulare Chemie*, vol. 84, (1965), pp. 93–107.

Lutz Wohlfarth, Jens Reussner and Manfred Arnold, *Alternating Copolymerization of Butadiene and Propene with the VO(ONeo)$_2$Cl/Al(iso—Bu)$_3$ System 2: Influence of Electron Donors at a Polymerization Temperature of -45 C* Plaste und Kautschuk, (38(9) 297–8 (1991).

*Primary Examiner*—Jeffrey T. Smith

[57] ABSTRACT

Flow of a stream comprised of hydrocarbons is improved by introducing into the stream a stable, non-agglomerating suspension comprising:

(a) water, (b) highly dispersed in the water, and substantially insoluble therein, and extremely finely-divided, non-crystalline, ultra-high molecular weight, hydrocarbon-soluble, undegraded polyalkene having 2 to about 30 carbon atoms per alkene precursor and an inherent viscosity of at least 20 dL/g, and (c) a small but effective amount of a surfactant having a HLB of at least about 9. The finely divided polyalkene is prepared by polymerization and then cryogrinding below the glass transition temperature of the polyalkene.

19 Claims, 1 Drawing Sheet

◇ NO SURFACTANT  △ "TRITON X-45" (HLB=10.4)
× "TRITON X-15" (HLB=3.6)  + "TRITON X-100" (HLB=13.5)

◇ NO SURFACTANT  △ "TRITON X-45" (HLB=10.4)
× "TRITON X-15" (HLB=3.6)  + "TRITON X-100" (HLB=13.5)

1

SLURRY DRAG REDUCER

BACKGROUND OF THE INVENTION

1. Field of the Invention

This invention particularly relates to improvement of flow of hydrocarbons such as crude oil or refined products in constricted conduits such as pipelines. It is presently believed to be of particular importance in the oil industry.

More particularly, it is directed to a method and composition for introduction into flowing streams of hydrocarbons such as crude oil or petroleum in a pipeline or refined products in a pipeline whereby the flow improver is readily dissolved into the flowing hydrocarbons, thus avoiding problems of the prior art relating to the necessity of transportation of hazardous materials and the notorious difficulty of dissolving effective flow improvers or drag reducers into flowing hydrocarbons. The stable nonagglomerating suspensions of the invention and the process for employing such suspensions go far toward resolving field difficulties.

This invention relates to copending application number U.S. Pat. No. 5,449,732 issued Sep. 12, 1995, relating to the preparation and use of non-crystalline, high-molecular weight, hydrocarbon soluble, polymers useful for drag reduction or flow improvement of flowing hydrocarbon streams, entitled "Solvent Free Oil Soluble Drag Reducing Polymer Suspension". In particular, that application discloses in detail one presently preferred method for preparing the finely divided polyalkenes of this invention.

This invention also relates to U.S. Pat. No. 5,376,697 issued Dec. 27, 1994, relating to the preparation and use of non-crystalline, high molecular weight, hydrocarbon soluble, polymers useful for drag reduction or flow improvement of flowing hydrocarbon streams, entitled "Drag Reducers For Flowing Hydrocarbons", and herewith incorporated by reference herein. In particular, that application discloses in detail another presently preferred method for preparing the finely divided polyalkenes of this invention.

By way of background, it is known that certain polymers which are oil soluble may be polymerized in the presence of catalysts to produce high molecular weight non-crystalline hydrocarbon soluble polymers by various means. These polymers, when dissolved in a hydrocarbon fluid flowing through a conduit, greatly reduce turbulent flow and decrease "drag" thus reducing the amount of horsepower needed to move a given volume of hydrocarbons, or conversely enable greater volumes of fluid to be moved with a given amount of power. In short, these polymers are drag reducers or flow improvers. Further, dilute solutions of high molecular weight polymers and solvents such as hydrocarbons, display useful flow characteristics unusual to the commonly known crystalline, largely non soluble, artifact-forming polymers such as polyethylene and polypropylene. In particular, these hydrocarbon soluble materials are noted for their effectiveness as drag reducing agents and anti-misting agents. An anti-misting agent is a polymer which, when dissolved in a hydrocarbon, serves to significantly increase medium droplet size and thereby reduce flammability of fuel sprays caused by high velocity wind shear, such as that which occurs during rupture of a fuel cell resulting from an impact such as an airplane crash.

One important characteristic of such polymers is their susceptibility to shear degradation when dissolved in hydrocarbons. Thus, passage through a pump, severe constrictions in a pipeline or the like where turbulent flow is encountered can shear the polymer and thereafter reduce effectiveness, in some cases dramatically so. Consequently, it is important that these polymers be placed into the flowing hydrocarbon stream in a form which achieves certain desirable features.

The polymer should be placed in a form adequate for easy transportation and handling without exotic or unusual equipment, since injection points for the polymer into the flowing hydrocarbon stream can often be at remote and inaccessible locations. The polymer must also be in a form which dissolves rapidly in the hydrocarbon being transported, since the polymers have little drag reducing effect until solubilized into the hydrocarbon stream. The polymer should also be innocuous to the ultimate purpose of the hydrocarbon fluid. For example, in the case of a crude oil flowing through a pipeline, larger amounts of water and contaminants can be tolerated than in finished pipeline products such as diesel fuel or gasoline which are ultimately destined to be burned in internal combustion engines and the like.

At the present time, a number of different commercial approaches have been taken to the problem of preparing, dissolving, transporting and using such drag reducing polymers. In use, these polymers form extremely dilute solutions (ranging from about 1 up to about 100 parts per million polymer in hydrocarbon) which are effective in order to achieve drag reduction or anti-misting. The common commercial method is the preparation of dilute solutions of polymer in an inert solvent such as kerosene or other solvating material as set forth in Mack, U.S. Pat. No. 4,433,123. Mack utilized a solution of high molecular weight polymer suitable for use as a drag reducing agent when produced by polymerization of alpha olefin in a hydrocarbon solvent. The entire mixture, containing polyolefin, solvent, and catalyst particles, is used without separation to form dilute solutions of the polymer in crude oil or other hydrocarbons. However, one disadvantage of such an approach is the use of a solvent, which poses a shipping and handling difficulty and may constitute a hazard. In addition, the product itself forms a gel-like substance which is difficult to introduce into flowing hydrocarbon streams and which becomes extremely viscous and difficult to handle under cold weather temperature conditions at some pipeline injection points.

In addition, it has been found necessary to terminate solution polymerization process reactions at no more than 20 percent polymer based on total reactor content by weight in order to obtain the high molecular weight polymers which are most effective, as taught in U.S. Pat. Nos. 4,415,714, 4,493,903, and U.S. Pat. No. 4,945,142.

A second approach is to prepare the polymers as a solid material as described in the Weitzen patent, U.S. Pat. No. 4,340,076. Weitzen taught that a high molecular weight polymer would be very rapidly dissolved in solvents if the polymer was ground in the solvent while below the glass transition point of the polymer. Polymer concentrations as high as 15 percent or more could be obtained, and only a few parts per million were needed in the flowing hydrocarbon stream for drag reduction or flow improvement. Three patents issued to O'Mara et al, U.S. Pat. Nos. 4,720,397, 4,826,728, and U.S. Pat. No. 4,837,249 all deal with finely grinding or reducing the polymers to very small particle size in an inert atmosphere below the glass transition point of the polymers in the presence of a partitioning agent to form a multi-layered coating which holds the inert atmosphere adjacent to the polymer particles after being ground. The patent teaches that it is mandatory that the reduction to fine particle size be carried out in an inert atmosphere utilizing a refrigerant such as liquid nitrogen and a coating agent while grinding the polymer to a size of less than 0.5 millimeters or about 35 mesh. This process requires that particles be maintained in an inert atmosphere without contacting water or oxygen until dissolved in the hydrocarbon solvent.

Thus, it is necessary either to have an impervious particle coating which prevents air or water from contacting the particle until dissolved, or the entire system must be maintained under an inert atmosphere until the material is dissolved. It can be seen to be bulky and cumbersome, especially at remote pipeline locations.

In a most successful commercial approach, the entire reaction mixture of a polymerization process, comprising a high molecular weight polymer dissolved in a polymerization solvent such as hexane, heptane, or kerosene in a concentration ranging from as low as 2 to 3 percent to a maximum of about 12 percent is utilized. While this material has proven to be difficult to pump under cold weather conditions, it is presently the most economical way to utilize polymer reaction products as drag reducing materials for flowing hydrocarbons.

All commercial processes or known processes to date for the preparation of polymers useful for drag reducing or flow improving purposes have a significant disadvantage. The ultra-high molecular weight materials which impart the best drag reduction or flow improvement in the flowing hydrocarbon streams are notoriously hard to dissolve. Either method requires additional equipment not normally utilized in pipeline locations and pump stations, and requires significant handling equipment investment. For example, U.S. Pat. No. 3,340,076 requires a source of liquid nitrogen for its operation. This substantially adds to the cost and difficulty of employment. The limitation on polymer content of 10 to 15 percent in current commercial processes also means that a great deal of shipping cost is incurred relative to the active polymer content.

2. Description of the Prior Art

Drag reducing polymers are described in the art. Representative but non-exhaustive examples of such prior art are U.S. Pat. No. 3,692,676, which teaches a method for reducing friction loss or drag for pumpable fluids through pipelines by adding a minor amount of the high molecular weight non-crystalline polymer. U.S. Pat. No. 3,884,252 teaches the use of polymer chunks as a drag reducing material. These materials are extremely visco-elastic and are not suitable for forming injection molded or blow molded articles. In general, these polymers have no known use other than drag reducing materials and anti-misting agents. The very properties that make these materials extremely effective as drag reducing additives make them extremely difficult to handle since they have a severe tendency to cold flow or reagglomerate, generally into a sticky mass.

The general propensity of non-crosslinked polymeric material to cold flow and reagglomerate is well known. Numerous attempts have been made to overcome the disadvantages inherent in solid cold flow in polymers. Representative but non-exhaustive of such art is that described in U.S. Pat. No. 3,791,913 when elastomeric pellets were surface cured to a minor depth in order to maintain the unvulcanized interior of the polymer within an enclosure of cured material in each pellet. U.S. Pat. No. 4,147,677 discloses a method of preparing a free-flowing finely divided powder of neutralized sulfonated elastomer by mixing with fillers and oils. U.S. Pat. No. 3,736,288 teaches solutions of drag reducing polymers in inert normally liquid vehicles for addition to liquids flowing in conduits for achieving a staggered dissolution effect by varying the size of the polymer particles. Suspending with surface active agents is also known. U.S. Pat. No. 4,340,076 discloses a process for dissolving high molecular weight hydrocarbon polymer in liquid hydrocarbons by comminuting the polymer into discreet particles and contacting these materials at near cryogenic temperatures with the liquid hydrocarbons to more rapidly dissolve the polymer. U.S. Pat. No. 4,584,244 cryogrinds drag reducing polymers under liquid nitrogen with alumina to obtain a free-flowing friable solid drag reducing composition.

U.S. Pat. Nos. 4,720,397, 4,826,728, and U.S. Pat. No. 4,837,249 deal with processes and compositions relating to a rapidly dissolving polymer composition or to polymer cryoground below glass transition temperatures and freshly cleaved surfaces in an inert atmosphere with a coating which holds the inert atmosphere adjacent to the polymer until dissolved in hydrocarbon.

Of the disclosures known to the inventors, perhaps U.S. Pat. No. 4,212,312 is the most nearly related to the invention at hand. It discloses forming drag reducing polymers which are particulated by dissolving the polymers into a low boiling solvent which is water immiscible together with surfactants to form an emulsion and thereafter removing the solvent from the emulsion by flashing.

U.S. Pat. No. 3,736,288 also has some relevance to the invention at hand. The patent discloses slurry formation of a water-soluble polymer drag reducer. The formulation comprises:

(a) a particulate water-soluble ethylene oxide polymer, (b) a water-miscible, non-solvent, organic vehicle, (c) a suspending agent, and (d) a surfactant.

The surfactant is employed to reduce the viscosity of the slurry but it does not improve drag reduction as is evident from the statement "the use of a surface active agent results in systems which are characterized by improved handling characteristics such as fluidity, pumpability, and/or pourability. Though the viscosity of the system is significantly decreased, the hydrodynamic drag reduction efficiency characteristics remain particularly unaffected" (Col. 1, lines 21–27). Data to support this statement is shown in Table 2 of the patent.

It is emphasized that in that patent, the carrier fluid is miscible with water and the drag reduction occurs in water. This is contrasted to the invention at hand in which the carrier fluid of the slurry is not miscible with the hydrocarbon in which drag reduction occurs. In the invention at hand, the surfactant seems to control the onset of dissolution, and thus improve drag reduction efficiency, though the inventors do not wish to be bound to this theory.

Canadian Patent 901,727 deals with a process of continuous polymerization. The process uses two rolls of sheeting which are formed into an envelope with a non-sealed but rolled edge. A liquid polymerization mixture is placed into the cavity formed by joining the two sheets. The process is useful for formation of compounds with polymerizable oxygen functions such as ethers, acetals, ketals, and esters. The enclosure is maintained until the polymerization is complete, whereupon the plastic sheet is recovered and the long strip of polymerized polymer is also recovered.

U.S. Pat. No. 5,244,937 discloses that cryoground drag reducing polymers can be suspended in water using a thickening agent and placed into flowing hydrocarbons as a suspension.

It is an object of the invention at hand to overcome disadvantages of the prior art and to provide a stable non-agglomerating suspension suitable for improving flow of a flowing stream comprised of hydrocarbons upon introduction therein to. Other objects will become apparent to those skilled in the art in view of the disclosure of this application.

SUMMARY OF THE INVENTION

This invention relates to improving the flow of a flowing stream of hydrocarbons such as petroleum or products in a conduit such as a pipeline. It also relates to a stable, non-agglomerating suspension suitable for improving flow of hydrocarbons. Essentially, a flow improving amount of a stable, non-agglomerating suspension which comprises:

(a) water,
 (b) highly dispersed in the water, and substantially insoluble therein, an extremely finely divided, non-crystalline, ultra-high molecular weight, hydrocarbon-soluble, undegraded, polyalkene having 2 to about 30 carbon atoms per alkene precursor and an inherent viscosity of at least about 20 dL/g, and
 (c) a small but effective amount of surfactant having a HLB balance of at least about 9 is introduced into a hydrocarbon stream.

The extremely finely divided, non-crystalline ultra-high molecular weight, hydrocarbon-soluble, undegraded, polyalkene can be prepared by polymerizing an alkene and reducing the polyalkene thus formed to a finely divided state at a cryogenic temperature below the glass transition temperature of the drag reducing polyalkene.

One way of effecting this is by the method taught in application U.S. Ser. No. 08/234,636 filed May 6, 1994, and entitled "Solvent Free Oil Soluble Drag Reducing Polymer Suspension". The method generally involves:

(a) combining at least one alkene containing from 2 to about 30 carbon atoms with a polymerization catalyst in the substantially complete absence of oxygen and water in an impermeable organic polymer reaction enclosure capable of substantially preventing passage of oxygen and water, the enclosure being of such size and shape as to effect high heat conductivity from the reaction enclosure contents to the exterior environment,
 (b) polymerizing the alkene while removing sufficient heat from the reacting polyalkene in the reaction enclosure to maintain the reaction at a temperature suitable for production of non-crystalline, high molecular weight polyalkene for a time sufficient to obtain such polyalkene at a level of at least 90 percent by weight based on total reaction content weight,
 (c) cooling the obtained polyalkene and the enclosure to a cryogenic temperature, and
 (d) reducing the reaction mixture and thus obtained polyalkene to a finely divided state at a cryogenic temperature below the glass transition temperature of the drag reducing polyalkene.

The suspension can also comprise about 0.5 to about 30 percent by weight of a mono- or multi-hydroxy alcohol which is substantially soluble in water, presently preferably a mono- or multi-hydroxylated alkane having 1 to 6 carbon atoms per molecule.

The invention goes far toward solving the current major problem in this art, that is, the extreme difficulty of delivering ultra-high molecular weight polyalkene flow improvers or drag reducers to injection points on lines, for example at remote locations, without a necessity of shipping the large amounts of other materials which have been necessary according to the prior art. The necessity of transporting and handling hazardous materials is eliminated.

The invention also provides a way of controlling dissolution of highly divided particles of the flow improving polyalkene into the hydrocarbon stream. For example, dissolution can be controlled such that it occurs after passage through a pump station or constriction in a pipeline material. As is known to the art, these materials are notoriously subject to shear degradation when dissolved. They are relatively insensitive to shear as microparticles in a suspension.

As relating to the disclosure of U.S. Pat. No. 4,212,312 of a process to make a slurry drag reducer by diluting the oil soluble polymer in a hydrocarbon, dispersing the solution in water with a surfactant, and then flashing off the hydrocarbon to leave a slurry of polymer in water with a surfactant therein, the inventive process has a clear advantage of avoiding the very difficult task of dissolving the polymer in the first place. The ultra-high molecular weight polyalkenes of the invention are extremely good flow improvers, but are extremely difficult to dissolve in an undegraded and effective state into hydrocarbons in a practical period of time, regardless of whether the hydrocarbons are a "solvent" or a petroleum stream. Furthermore, the properties that make the ultra-high molecular weight polyalkenes of the invention excellent anti-misting agents also make it nearly impossible to emulsify hydrocarbon solutions of them without severe degradation as is called for by the disclosure of U.S. Pat. No. 4,212,312. Indeed, it is very dubious as to whether the process disclosed in U.S. Pat. No. 4,212,312 would even work with the ultra-high molecular weight polyalkenes of the invention at hand, though it may have substantial merit for other polymers which it discloses.

Suspensions prepared according to this invention have a potentially higher polyalkene concentration than suspensions which might be prepared without a surfactant. It is surprising that the suspensions of the invention improve drag reduction and allow control of the onset of drag reduction by controlling the surfactant HLB. Reasoning from the state of the art it would be predicted that the hydrophobic tail of the surfactant would be oriented towards the polymer particle, thus orientating the hydrophilic tail out toward the water. Thus, it would be further predicted that the resultant cloud of hydrophilic moieties surrounding each polyalkene micro particle would greatly promote suspension stability but would also greatly hinder the dissolution of the polyalkene into a flowing hydrocarbon stream. Our invention is based on the unexpected discovery that the opposite in fact is true. The presence of surfactants having suitable HLB numbers in the suspensions unexpectedly aids dissolution into the hydrocarbons and improves drag reduction or enhances flow improvement of the hydrocarbon streams.

DESCRIPTION OF THE PREFERRED EMBODIMENTS

Figure 1:
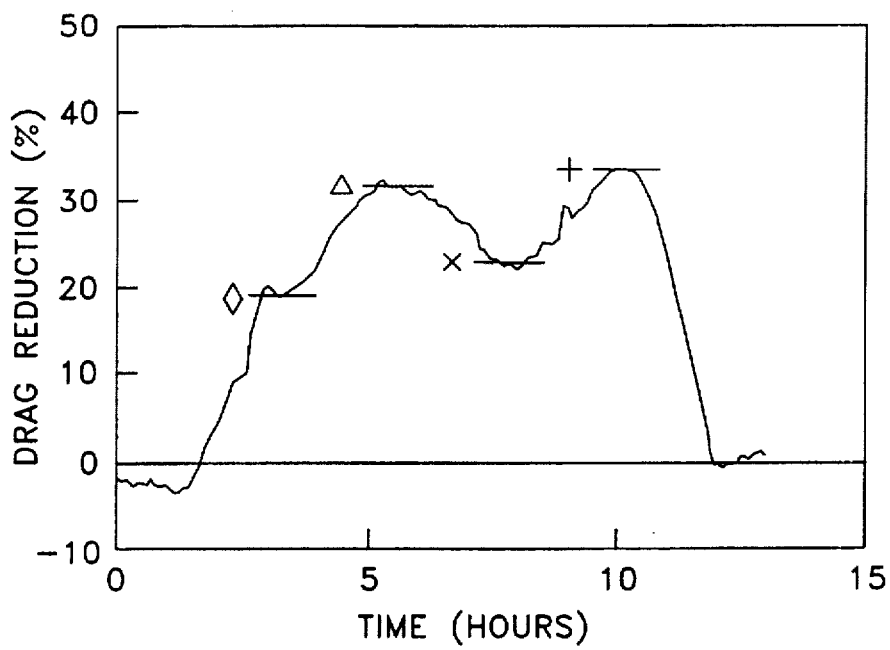
FIG. 1 is a graphical depiction of the effect of surfactants having differing HLB values on drag reduction in a pipeline.

The stable non-agglomerating suspensions of the invention somewhat resemble latex paint in physical appearance. No significant amount of solvents or hydrocarbons needs to be employed. Accordingly, handling and exposure hazards are substantially eliminated.

The finely divided polyalkenes of the invention can be produced by bulk polymerization of alkenes to form an ultra-high molecular weight polymer, cryogrinding the polymer to a fine powder, and mixing the powder with water and surfactant to obtain a stable slurry. Use of a suitable suspending agent is highly beneficial to obtain stable slurries or suspensions. In addition to water, surfactant, and the highly dispersed, extremely finely divided, non-crystalline, ultra-high molecular weight, hydrocarbon soluble, undegraded polyalkene of the invention, the non-agglomerating suspension can also contain from about 0.5 to about 30 percent by weight of a mono- or multi-hydroxy alcohol which is substantially soluble in water, presently, preferably an alkanol, alkane diol, or a multi-hydroxylated alkane having about 1 to about 6 carbon atoms per molecule. Although it is possible to employ other solvents or additives with bulk polymerization processes, it is preferred that the reaction end product be as solvent-free as possible, providing a substantially solvent-free polymerization process and drag reducing product. Normally, the bulk polymerization reactor contents will contain at least 80 percent polymer by weight. The reactive alkenes are normally substantially totally polymerized (above 95 percent polymer content by weight), although the reactor can be viscosity-modified by the addition of non-reactive components such as dilute hydrocarbons. Reactive alkenes will normally comprise at least 80 percent of a total reactor content, and preferably 90 percent of a total reactor content.

According to one presently preferred embodiment, the polyalkenes of the invention are prepared by carrying out polymerization of 1-alkenes containing from 2 to about 30 carbon atoms wherein the polymerization is carried out above 0° F. while removing sufficient heat of reaction to allow formation of a substantially non-crystalline, hydrocarbon soluble, ultra-high molecular weight polymer having an inherent viscosity (IV) of at least 20 deciliters per gram (dL/g). Polymerization is carried out using catalysts requiring exclusion of oxygen and water deactivation by water or oxygen.

In a more general aspect, the polyalkenes of the invention can be produced via bulk or solution polymerization from alkenes to produce a substantially non-crystalline, hydrocarbon-soluble, ultra-high molecular weight drag reducing polymer which is effective to impart flow improvement to flowing streams of hydrocarbons.

A presently preferred polyalkene can be produced by the bulk or solution polymerization of alkenes containing 2 to 30 carbon atoms in the presence of a polymerization catalyst under polymerization conditions while removing sufficient heat of reaction to obtain a polymer having an inherent viscosity (IV) of at least 20 deciliters per gram (dL/g); however, an IV of 25 dL/g or greater is preferred. Though bulk polymerization is disclosed in detail herein, equal detail is disclosed for the also presently preferred solution polymerization mode disclosed in detail in application number 08/081,495 and incorporated by reference herein.

Because of the extremely high molecular weights involved, the procedure for determining IV is modified, using a four-bulb shear dilution viscometer, and measuring at 0.05 grams (g) of polymer/100 milliliters (ml) of hexane solvent at 25° C. and a shear rate of 300 seconds$^{-1}$ where the results of the high shear bulb are not used.

The drag reducing art teaches that it is necessary to keep monomer concentrations low (below 20 percent by weight total polymer) in solution polymerizations in order to achieve molecular weights capable of imparting good drag reduction (U.S. Pat. Nos. 4,358,572, 4,415,714, 4,433,123, 4,493,903), and preferably carrying out polymerizations at as low a temperature as possible consistent with commercial production. U.S. Pat. No. 4,384,089 requires a significant portion of the reaction be carried out at low temperatures and the monomer is chilled. Such polymers can also be employed in accordance with this invention.

Ultra-high molecular weight polyalkenes produced by bulk polymerization of 1-alkenes can be produced at relatively high temperatures and at high monomer concentrations. These ultra-high molecular weight polyalkene drag reducers can be significantly larger (molecular weight basis) than the highest molecular weights made by solution polymerization.

Some presently preferred finely divided, non-crystalline, ultra-high molecular weight, hydrocarbon soluble, undegraded polyalkenes useful, according to this invention, to improve the flow of hydrocarbons can be produced by a procedure which comprises:

(a) combining at least one alkene containing from to 2 to 30 carbon atoms capable of being polymerized to form a non-crystalline, ultra-high molecular weight polyalkene with a polymerization catalyst in a thin-walled impermeable organic polymer reaction enclosure capable of substantially preventing passage of oxygen and water into the reaction enclosure, the enclosure being of such size and shape as to effect high heat conductivity from the reaction enclosure contents to the exterior environment, (b) polymerizing the alkene to produce a non-crystalline, ultra-high molecular weight polyalkene while removing sufficient heat from the reacting alkene in the reaction enclosure to maintain the reaction at a temperature suitable for production of non-crystalline, ultra-high molecular weight polyalkene for a time sufficient to obtain such polyalkene, (c) cooling the obtained polymer and the enclosure to a cryogenic temperature, and (d) reducing the reaction enclosure and obtained polyalkene to a finely divided state at a cryogenic temperature below the glass transition temperature of the polyalkene.

The term "substantially" as used in this context means that the reaction enclosure is capable of excluding sufficient oxygen and water to permit the polymerization to occur, and recognizes that incidental amounts of water and oxygen may in fact pass through the reaction enclosure.

It is generally recognized that a problem with bulk polymerization is removing the high heat of reaction, since temperatures reached can rise 500° F. up to about 580° F. As set forth in Mack, U.S. Pat. No. 4,358,572, the molecular weight of the final product is very sensitive to the temperature of the polymerization reaction. A change of 10° F. in the starting temperature can change the inherent viscosity (an indirect measurement of molecular weight) by one unit or more.

In bulk polymerizations, the ultra-high molecular weight polymer of the invention can be obtained without cooling the feed or cooling the reaction mixture to low temperatures. The reactions of the present invention optionally can be conveniently started at room temperature and the temperature rise held to about 60° F. to provide a preferred ultra-high molecular weight polymer.

It is, however, necessary to control the heat rise in bulk polymerizations in order to obtain maximum molecular weight (inherent viscosity) required for best drag reduction. There is a maximum reaction enclosure dimension above which reaction heat cannot be removed faster than generated by the reaction. In polymerization reactions using the alkenes described, the maximum thickness is estimated to be about 9 inches. However, in order to keep the temperatures sufficiently low to make ultra-high molecular weight polymer everywhere in the reaction container, it is preferred to design reaction enclosures as small as possible in the various dimensions. Reaction vessels must be shaped such that maximum surface area is exposed to a cooling medium in order to obtain ultra-high molecular weight polyalkenes.

Polymeric bottles and bags have been evaluated and found to be effective polymerization reaction vessels (reaction enclosures). However, the produced polyalkene is extremely adherent to the walls of such reaction vessels, and therefore polymeric reaction vessels are ground together with the final product in forming the drag reducing or flow improving materials of the invention at hand. It is, of course, possible to carry out bulk polymerization to produce suitable polyalkenes in conventional reactors, belt polymerization systems, clam-shell reactors, or reactions in single-layer polymer reactors (bottles or bags). While all reactor types can be used, the presently described preferred modes are simply the most effective means found so far.

The bulk polymerization can be carried out using any olefin polymerization catalyst, but it is presently preferred to carry out the reaction in the presence of a Ziegler-Natta catalysts. These catalysts are notoriously sensitive to oxygen and water. Accordingly, the reaction enclosures must be made of barrier polymers which are capable of excluding air and water from the reaction mixture during the time the reaction is taking place. These barrier polymers are crystalline and are non-soluble in hydrocarbons in which the drag reducing non-crystalline polymers are soluble at ambient conditions, such as crude oil or refined products. Cross-linking may be present in these barrier polymers.

Suitable polymerization has been demonstrated with bottles and bags containing 5 to 7 layers, including a water impervious polyolefin such as polypropylene, polyethylene, polybutylene, a bonding polymer, and ethylene vinyl alcohol copolymer oxygen barrier, another bonding polymer, and externally coated with polyethylene, polypropylene, or polybutylene. Use of polyethylene terephthlate as an additional layer to add reactor strengths at high temperatures is preferred. Ethylene vinyl alcohol copolymer is an excellent oxygen barrier but a poor water barrier, while polyethylene, polypropylene, polybutylene, and the like are excellent water barriers, but do not permit the passage of oxygen. As these barrier materials do not have good mutual adhesion, a polymer designed to adhere to both is sandwiched between these materials as an adhesive there between. An example of the bonding polymer or adhesive are the co-extrudable adhesive polymers sold under the trademark "BYNEL" by the DuPont Company.

Ethylene vinyl alcohol also has better oxygen barrier properties when dry, and placing the ethylene vinyl alcohol layer interior to the water resistant exterior polyolefin materials enhances its oxygen barrier effectiveness. A function of the polyolefin layer adjacent to the reaction mixture is to protect the catalyst from the functional groups on the ethylene vinyl alcohol copolymer.

Although the foregoing reactor materials have been used successfully, it is apparent that substitutions can be made by those skilled in the art. For example, some nylons and polyesters have adequate oxygen barrier properties. Most thermo-plastic, crystalline polyolefins could replace those mentioned for forming the bottles and bags. However, for cost-effectiveness and readily available materials, the ones specifically mentioned are preferred, although there is no technical reason not to substitute other materials capable of similar performance. The presence of the finely ground disposable reactors does not have an adverse effect on drag reduction or flow improvement or on the hydrocarbon in which the drag reducer is dissolved. Since the drag reducing polymer is normally present at levels no higher than 50 parts per million (ppm) in the hydrocarbon, the disposable reactor particles are present at levels of less than 1 ppm. In the case of crude oils, the materials are principally hydrocarbons and are simply refined along with the other hydrocarbons in the stream.

The Ziegler-Natta catalysts used can be any of those described in the art. Particularly useful materials are those described in U.S. Pat. Nos. 4,945,142, 4,358,572, 4,371,455, 4,415,714, 4,333,123, 4,493,903, and U.S. Pat. No. 4,493,904. To some degree, the concentration of catalysts which is optimum depends upon the dimensions of the reaction vessel, which is most likely related to higher temperatures which in turn results from larger vessels. Cooling can compensate for differences in catalyst concentration to some degree. In bulk polymerization systems, catalysts are used typically at a concentration of 3500 moles monomer per mole transition metal halide in the catalyst, although ratios can vary from as low as 500/1 to as high as 10,000/1 or more. Catalyst concentration affects rate of reaction and temperature as well as molecular weight.

Utilizing the foregoing catalysts in bulk polymerizations, consistent conversions of more than 95 percent polymer by weight can be obtained, such that the polymer content of a reactor is 80 percent or more, preferably 90 percent or more, and most preferably more than 95 percent by weight non-crystalline drag reducing polymer, based on total reactor content weight. The molecular weight of the product is so high that inherent viscosity techniques used to measure current commercial products cannot measure the resultant product. At the current test concentration (Procedure A) of 0.1 dL/g using toluene solvent, the bulk polymerized polymer tends to plug the capillary tubes. IV is utilized as an indirect measurement of molecular weight because the extremely high molecular weight of these materials makes the normal methods of determining molecular weight unreliable. Accordingly, inherent viscosity is determined for bulk polymerized polymers using a Cannon Ubbelohde four-bulb shear dilution viscometer and a revised procedure to accommodate the extremely high molecular weight (0.05 gram polymer/per 100 milliliters hexane solvent at 25° C.). Inherent viscosities are calculated for each of the last three bulbs (the high shear rate bulb is discounted because of excessive shear thinning) and plotted as a function of average shear rate. The plot is then used to obtain an inherent viscosity at a shear rate of 300 seconds$^{-1}$ (Procedure B). Typical values of bulk polymers are 25 to 31 dL/g.

As shown in the table following, IV results are about 1.5 times greater for Procedure B. All samples are solution polymerized polyalkenes.

TABLE 1

| Sample | A (dL/g) | B (dL/g) | Ratio B/A |
|---|---|---|---|
| 1 | 15.6 | 23.2 | 1.49 |
| 2 | 15.9 | 23.9 | 1.50 |
| 3 | 15.8 | 23.9 | 1.52 |
| 4 | 15.9 | 24.0 | 1.51 |

TABLE 1-continued

| Sample | A (dL/g) | B (dL/g) | Ratio B/A |
|---|---|---|---|
| 5 | 15.7 | 23.8 | 1.52 |
| 6 | 15.6 | 24.3 | 1.56 |

Bulk-polymerized polymers could not be tested using Procedure A since a solution capable of being tested could not be formed.

Such polymers are extremely effective relative to many solution polymerized materials now in commercial use which contain solvent, although certain solution polymerized materials which meet the needs of this invention can also be employed, and indeed, are presently also preferred for certain applications. Prior art methods noted heretofore can be employed to prepare suitable solution polymerized polyalkenes as can the method disclosed in application number 08/081,495.

If a solution polymerization procedure is employed to prepare suitable polyalkenes, it is often appropriate to precipitate the polyalkene as with an alcohol, dry to remove the alcohol, and then cryogrind according to known techniques.

The following is an example of preparation of a suitable slurry by the method of application number 08/081,495. The preparation of a drag reducing paste by precipitation of polyalkene from a solution polymerized drag reducer was carried out using an apparatus similar to that shown in FIG. 1 of application number 08/081,495. The apparatus consisted of an inner ½-inch Schedule 80 pipe, and an outer 1½-inch Schedule 160 pipe, each pipe was 3 feet in length. The ½-inch pipe contained 240⅛-inch holes covered with 40 mesh wire. A commercial polymeric drag reducer solution, CDR 102M Flow Improver, trademark of and sold by Conoco Specialty Products, Inc., was introduced into the outer pipe at a rate of 0.04 gallon/minute and isopropyl alcohol was introduced to the inner pipe at a rate of 0.4 gallons/minute. The mixture leaving the apparatus;s consisted of precipitated polyalkene in the form of small stranded (about 1-inch long) pieces entrained in the alcohol/hydrocarbon fluid. The skins of the stranded pieces were white colored indicating the extraction of the drag reducer solvent from that part of the polyalkene solution. The mixture was allowed to flow into 55-gallon containers where the mixture was periodically stirred and allowed to remain for three days. After three days, the stranded pieces were totally white indicating full extraction of the drag reducer solvent, leaving nearly pure polyalkene pieces. The polyalkene pieces were removed from the mixture by filtration. A small amount of alumina, about 2 percent by weight, was mixed into the "wet" polyalkene pieces (to reduce tendency for stickiness or agglomeration of the pieces after drying). The polyalkene pieces were then placed into an oven at about 160 degrees F. for drying. The resulting dry polyalkene was then cryoground to produce a fine drag reducing powder. During this cryogrinding, a coating agent sometimes referred to as a partitioning agent, is preferably added to prevent the freshly exposed surfaces from sticking together.

Representative but non-exhaustive examples of suitable coating agents are alumina, calcined clay, talc, carbon black, calcium stearate, magnesium stearate, and the like. The level of coating agent may vary depending on the coating agent used but can be up to about 30 to 35 percent based on the weight of the polymer. Blends of coating agents can be used and may be desirable for creating a stable slurry.

The powdered drag reducer is added (following storage and transportation) to a stirred container of water which also contains a small but effective amount of a surfactant having a HLB above 9 and other materials as disclosed in this application to prepare a stable slurry.

Suitable polyalkenes for the invention can be prepared with a variety of alkenes and alkene mixtures. It is only necessary that sufficient higher molecular weight alkenes (carbon atom numbers above about 4) be present to produce a polymer which is ultimately substantially non-crystalline and hydrocarbon soluble. Substantial amounts of lower carbon atom number monomers such as ethylene and propylene will ultimately produce a more crystalline product which will be less soluble in flowing hydrocarbons. However, these materials can be present for whatever advantage they offer to particular solution of problems in specific flowing hydrocarbon systems. Thus, from 5 to 50 mole percent of a $C_2$ to $C_4$ monomer is entirely feasible while achieving high molecular weights and dissolution in flowing hydrocarbon streams.

It is particularly advantageous to utilize mixtures of monomers, individually represented by $C_2$, $C_3$, $C_4$, $C_5$, $C_6$, $C_8$, $C_{10}$, $C_{12}$, $C_{14}$, $C_{16}$, and the like. Monomer mixtures appear to react at least as fast as individual monomers, but the resultant copolymers seem to have less crystallinity than homopolymers because of the different monomers used. Lack of crystallinity is extremely advantageous in dissolution of the materials in the hydrocarbon stream, with resultant increase in drag reduction or flow improvement. While even number carbon atom monomers are mentioned because of commercial availability, no technical reason exists to avoid employing odd number carbon atom monomers, if available.

For reactions which are incomplete, removal of unreacted monomer is advantageous, and this can be carried out by vacuum drying and/or vacuum drying with precipitation according to well-known techniques. However, it is preferred that a bulk reaction simply be carried out to substantial completion and that the drying step to remove monomer and/or solvent be avoided whenever possible for reasons of economy.

In usual practice, the catalyst and monomer are combined in a reaction vessel and agitated at ambient conditions for a period of time sufficient to increase viscosity of the reactants sufficiently to suspend the catalyst and then placed into a cool environment to allow the reaction to proceed. The cool environment is normally maintained at a temperature from about 0° F. to about 80° F., allowing the reaction to proceed at a relatively constant pace, while removing heat and forming ultra-high molecular weight polymers. Conversions of more than 95 percent can be obtained, although reaching such conversion levels may require several days.

At the completion of the polymerization, the entire reaction vessel can be cryoground or for handling purposes can be chopped and the chopped particles then cryoground in a cold mill. It is most convenient and economical to cryogrind utilizing liquid nitrogen to freeze the material below the glass transition temperature of the polymers. During this cryogrinding, a coating agent sometimes referred to as a partitioning agent, is preferably added to prevent the freshly exposed surfaces from sticking together.

Representative but non-exhaustive examples of suitable coating agents are alumina, calcined clay, talc, carbon black, calcium stearate, magnesium stearate, and the like. The level of coating agent may vary depending on the coating agent used but can be up to about 30 to 35 percent based on the weight of the polymer. Blends of coating agents can be used and may be desirable for creating a stable slurry.

Once the polyalkene is cryoground, it is slurried in water or a water-alcohol solution. Suitable alcohols are those alcohols which are miscible in water in the proportion used, such as ethanol, propanol, isopropanol, butanol, isobutanol, and glycols such as ethylene glycol and propylene glycol. Multi-hydroxy alcohols such as glycerine and the like can also be employed. Mixtures of alcohols can also be used. It is only necessary that the alcohols used form a continuous phase with the water and any viscosifying (suspending) agents and surfactants used. It is often desirable to employ sufficient alcohol to impart freeze resistance to the slurry when the slurry may be exposed to freezing conditions. The suspension can comprise from about 0.5 to about 30 percent by weight of a mono- or multi-hydroxy alcohol which is substantially soluble in water. Presently, it is preferred that the alcohol have the formula $R(OH)_n$ wherein R is an alkyl radical having 1 to about 6 carbon atoms and n is an integer of about 1 to about 4.

It is necessary to obtain a stable slurry in order to obtain a satisfactory commercial product of the stable non-agglomerating suspension of the invention. Stability can be improved by increasing the viscosity of the water phase, but it is desirable that the viscosity of the final slurry be sufficiently low to flow by gravity to an injection pump for insertion into the flowing hydrocarbon stream. In order to increase the viscosity of the slurry, one or more water-soluble polymers can be employed. Some examples of such suitable water-soluble polymeric thickening agents include guar gum, guar gum derivatives, hydroxymethyl cellulose, xanthan gums, polyacrylamides, hydroxypropyl cellulose, modified starches, and polysaccharides. The foregoing examples are non-limiting and other suitable thickening agents will suggest themselves to those skilled in the art or can be determined by experimentation not amounting to invention.

It is essential that a small but effective amount of a suitable surfactant having a HLB of at least 9 be employed. Ionic or nonionic surfactants can be employed, it is presently preferred to employ nonionic surfactants. Some non-limiting examples of suitable surfactants include organic ammonium phosphates, ethylene oxide condensates, ethoxylated alcohols, alkyl aryl polyetheralcohols, alkylphenol hydroxypolyoxyethylenes, polyoxyethylene sorbitan monolaurate, polyethylene glycol ethers of linear alcohols and octylphenoxy polyethoxyethanol.

HLB (hydrophilic-lipophilic-balance) is an indication of the percentage weight of hydrophilic portion of the surfactant. For example, if HLB is 0 it means that the surfactant is oil loving. If the HLB is 20, it means the surfactant is water loving. In general, HLB value is determined by calculation rather than experimentally. Common practice for simple non-ionic surfactants is to look at the whole chemical formula, calculate the total molecular weight (including both hydrophilic and lipophilic portions), calculate the molecular weight of the hydrophilic portion, find the percentage and divide that number by 5. Thus, the maximum that HLB can be is 20. Any surfactant has a distinctive HLB number. Thus, the lower the HLB value, the more lipophilic the surfactant and the higher the HLB value the more hydrophilic. Further discussion on the practice can be found in "Emulsion Theory and Practice", by Paul Becher, Rhinehold Publishing (1957). Of course, HLB values for mixtures of surfactants can be calculated which are merely the weighted average of the HLB of the individual surfactants.

According to the invention, a small but effective amount of a surfactant having a HLB of at least about 9 is employed. It is presently preferred that the HLB of the surfactant or mixture of surfactants be from about 9 to about 15. The small but effective amount needed is generally in the range of about 0.05 to about 1 percent by weight of the suspension weight.

Table 2, following, discloses typical but nonlimiting exemplary suspension or slurry recipes useful for the invention. "HEC" refers to hydroxyethyl cellulose; "HPE" refers to hydroxypropyl guar gum; "Triton X-45" is the trademark of Union Carbide for the octylphenoxy polyethoxyethanol surfactant sold by it; "MERPOL - SE" is the trademark of the DuPont Company for the ethylene oxide condensate nonionic surfactant sold by it; "XAN-VIS" is a xanthan gum suspending agent; the numerals in each box are exemplary amounts and the numerals in the parentheticals are exemplary ranges:

TABLE 2

| | Exemplary Slurry Recipes | | | |
|---|---|---|---|---|
| water (lb) | 1000 (800–1200) | 1000 (800–1200) | 1000 (800–1200) | 1000 (800–1200) |
| isopropanol (lb) | 10.1 (7–15) | 100 (50–150) | — | — |
| propylene glycol (lb) | 20.1 (15–25) | — | 17 (10–20) | — |
| antifoam 1410 (lb) | 26.0 (20–40) | 25 (10–30) | — | 20 (15–25) |
| surfactant (lb) | 5.2 (1–20) TRITON X-45 | 11.2 (1–20) TRITON X-45 | 5 (1–20) MERPOL-SE | 8 (1–20) TRITON X-45 |
| NaHCO3 (lb) | 0.4 (0–1) | 4 (0–10) | — | 2 (1–3) |
| Na2CO3 (lb) | 0.4 (0–1) | 5 (0–10) | 6 (2–8) | — |
| cryoground polymer powder (lb) | 540.6 (500–600) | 550 (500–600) | 500 (400–600) | 340 (300–400) |
| suspending agent (lb) | 5.3 (3–6) HEC | 6.5 (5–7) HEC | 1.7 (1–2) HPG | 2.8 (2–3) XAN-VIS |

Table 3, following, discloses some specific but non limiting examples of exemplary surfactants of the invention including trademarks for the materials, chemical names, and HLB numbers.

TABLE 3

| Specific Exemplary Surfactants | |
|---|---|
| Merpol SH | ethylene oxide condensate, non-ionic HLB: 12.8 |
| Merpol OJ | ethylene oxide condensate, non-ionic HLB: 12.5 |
| Merpol SE | ethylene oxide condensate, non-ionic HLB: 10.5 |
| Alkanol A-CN | ethylene oxide condensate, non-ionic HLB: ___ |
| "Triton X-45" | octylphenoxy polyethoxyethanol, non-ionic HLB: 10.4 |
| "Triton X-100" | octylphenoxy polyethoxyethanol, non-ionic HLB: 13.5 |
| "Triton X-102" | octylphenoxy polyethoxyethanol, non-ionic HLB: 14.6 |
| "Triton XL-80N" | alcohol is primary alcohol, alcohol $C_8$–$C_{10}$ ethoxylated propoxylate, non-ionic HLB: ≈ 13–14 |
| Tween 20 | polyoxyethylene sorbitan monolaurate, nonionic HLB: 16.7 |
| Tween 40 | polyoxyethylene sorbitan monopalmitrate, nonionic HLB: 15.6 |
| Tergitol 15-5-7 | polyethylene glycol ether of linear alcohol, nonionic HLB: 12.1 |

Optionally, biocides and defoamers can be employed to prevent bacterial growth in the slurry mixture and to prevent foaming during formation and pumping of the slurry itself. These are not essential but in many cases are desirable to resolve or prevent a problem.

Representative but non-exhaustive examples of defoaming materials are the agents marketed under the Antifoam trademark of and sold by Dow Corning, Midland, Mich., U.S.A., and the products marketed under the Bubble Breaker trademark of and sold by Witco Chemical Company, Organics Division.

Representative but non-exhaustive examples of biocides are water-soluble polyoxymethylenes such as Dowicil, trademark of and sold by Dow Chemical Company and Proxel BD, a trademark of and sold by ICI Americas Inc.

Antifreeze materials other than alcohols can also be employed for appropriate conditions.

The invention is more fully described with reference to the examples wherein all parts and percentages are by weight unless otherwise specified. The examples are provided to exemplify and illustrate the invention but should not be construed to limit it.

Example 1

A catalyst slurry was prepared by combining 0.40 grams of $TiCl_3$.AA in solvent (solvent level is chosen to be sufficient to agitate the $TiCl_3$.AA) together with dibutyl ether promoter according to the teachings of Mack U.S. Pat. No. 4,416,714. The mixture was agitated for 30 minutes, and aluminum alkyl co-catalyst was added. The catalyst slurry was then agitated for 30 minutes.

A 40 ounce (1.18 liter) laminated barrier bottle was filled with 1000 grams of decene and aluminum alkyl co-catalyst before being purged with nitrogen and dried. Catalyst was injected into the bottle to activate the polymerization reaction. Each bottle was shaken for 5 to 10 seconds, then put into a rolling tube to continue agitation for about 3 minutes. When the bottles emerged from the roller the reaction had proceeded to the extent that the decene had viscosified such that the catalyst did not settle. The bottles were placed into a refrigerated room at 12° F. After 24 hours the bottles were returned to ambient conditions and allowed to stand for two weeks to complete the polymerization.

| Catalyst Activation | |
|---|---|
| $TiCl_3$.AA | 0.40 grams (2.0 m moles) |
| slurry in approximately 40 ml solvent (solvent level is chosen to be sufficient to agitate the $TiCl_3$,) | |
| Dibutyl ether | 0.38 ml (2.2 m moles) |
| agitate for 30 minutes | |
| Diisobutyl aluminum chloride (25% in heptane) | 4.0 ml (4.0 m moles) |
| agitate for 30 minutes | |
| Reaction in 40 Ounce Polymerization Bottle | |
| Decene | 1000.0 grams |
| Diisobutyl Aluminum Chloride (25% in heptane) | 10.0 ml |
| Catalyst from above recipe | 4.0 ml |

Such a catalyst typically has about 95% conversion to polymer having an inherent viscosity of 28 dl/g.

Example 2

A second catalyst was prepared using the following recipe and method of preparation:

| | |
|---|---|
| TiCl3 AA | 0.40 grams (2.0 m moles) |
| slurry in approximately 40 ml solvent, such as hexane (solvent chosen to be sufficient to agitate the TiCl3) | |
| Dibutyl ether | 0.38 ml (2.2 m moles) |
| Agitate 30 minutes | |
| Diisobutyl aluminum chloride (25% in heptane) | 4.0 ml (4.0 m moles) |
| Agitate 20 minutes | |
| Polyethylene siloxane (PMMS) | 2.0 ml (2.0 m moles) |
| Agitate 10 minutes | |

Typical results will closely compare to those for the recipe derived in Example 1.

Example 3

Catalyst prepared as in Examples 1 or 2 can be prepared utilizing other ethers in the catalyst activation recipe. Dibutyl ether can be substituted by any one of benzyl ether, n-propyl ether, isopropyl ether, methyl tert-butyl ether, and diethyl ether. These promoters are shown experimentally by Mack in patent 4,416,714 to increase inherent viscosity of produced polymers at a decreased rate. In bulk polymerization systems the rate decrease is not significant and these materials will produce effective drag reducing polymers.

Example 4

The catalyst preparation of Examples 1 and 2 is repeated utilizing catalyst described in Mack U.S. Pat. No. 4,493,903 utilizing $TiCl_3$AA 1.13 a camphor-modified $TiCl_3$. A phosphorous-containing catalyst modifier is substituted for the ether. The resulting polymer will have comparable IVs to those shown in Example 1 and will be an effective drag reducer. The following catalyst preparation is utilized.

| Catalyst Preparation: | |
|---|---|
| TiCl3 AA (Type 1.13) | 0.40 grams |
| | (2.0 m moles) |
| slurry in approximately 40 ml solvent, such as hexane | |
| (solvent chosen to be sufficient to agitate the TiCl3) | |
| Triphenylphosphine | 0.45 ml |
| | (0.3 m moles) |
| Agitate 30 minutes | |
| Diisobutyl aluminum chloride | 4.0 ml |
| (25% in heptane) | |
| Agitate 30 minutes | |

Example 5

Using a process similar to that described in Example 1, bulk polymerized material was produced in numerous bottles. Bottle lids were removed and the bottles were chopped into chunks averaging about ½inch (13 mm) in diameter for ease of handling. The chunks were then cryoground under liquid nitrogen together with the reaction vessels to obtain a free-flowing finely divided powder in the presence of a calcium stearate partitioning agent.

The cryoground free-flowing powder and partitioning agent were allowed to warm to ambient conditions at room atmosphere. The warmed particles were then slurried and suspended. The final suspension contained:

- 86 grams ground powder (30% solids loading in the slurry)
- 1 gram Dowicil 75, trademark of and sold by Dow Chemical Company, as biocide
- 5 grams Antifoam 1410, a silicon-based antifoam trademark of and sold by Dow Corning Corporation
- 1 gram non-ionic surfactant (Triton X-45, trademark of and sold by Union Carbide)
- 1.2 grams hydroxyethyl cellulose.

The mixture was mixed at high speed for 20 minutes and produced a stable, latex-like slurry.

In the examples which follow, actual drag reduction data is presented. Reference is made to the article "Drag Reduction Fundamentals" by P.S. Virk, *AIChE Journal*, Volume 21, No. 4, July, 1975, hereby incorporated by reference. This article provides a complete review on the subject of drag reduction in turbulent flow using dilute polymer solutions. Precisely stated, the article describes three regimes for fully turbulent pipe flow of dilute polymer solutions, appearing in the following order as flow rate increases.

(1) A first regime without drag reduction where the friction factor/Reynolds number relationship is the same as for the solvent.

(2) The second regime is a drag reduction regime in which the friction factor depends on the nature of the polymer solution, such as the polymer concentration and molecular weight.

(3) The third regime is an asymptotic regime of maximum possible drag reduction described as a universal rule that depends only on Reynolds number and is independent of additive properties or concentrations.

Examples 1 through 4 thus disclose preparation of only some exemplary non-crystalline ultra-high molecular weight hydrocarbon soluble polyalkenes of the invention. Others can be prepared as described hereinabove Example 5 discloses preparation of an exemplary stable non-agglomerating suspension of the invention.

Pipeline Tests

A series of runs were made in actual crude oil carrying pipelines to demonstrate the effectiveness of the suspensions of the invention in comparison to suspensions not containing surfactant within the requirements of the invention. The results are presented in Table 4, following:

TABLE 4

| | Comparison of Dissolution Rates | | |
|---|---|---|---|
| | Percent-Polyalkene Dissolved Downstream of Injection Point | Total Percent Dissolved Just Upstream of Pump Station | Percent Dissolved After Pump Station |
| No Surfactant | 35% | 70% | 30% |
| Surfactant | 75-95% | 95-100% | 0 |

The data of Table 4 show that employment of surfactant according to the invention greatly improves dissolution of polyalkene into a flowing stream of hydrocarbons. The data also demonstrate tailoring surfactant concentrations and HLB numbers to control dissolution such that flow improvement might still be available after passing through a shear point in a flowing hydrocarbon stream.

Since the first series of runs contain some variables other than surfactant type, a second series of runs was carried out wherein the only variable was surfactant type. A slurry recipe as shown in Table 5 was employed containing 0.39 percent surfactant.

TABLE 5

| Slurry Recipe | |
|---|---|
| 3750 gr | water |
| 94 gr | antifoam 1410 |
| 19 gr | surfactant |
| 26 gr | Hydroxyethyl cellulose |
| 938 gr | polydecene powder with 25% calcium stearate |

This series of runs involved injection of the surfactant types as shown in the following Table 6.

TABLE 6

| Slurry | Drag Reduction in Pipeline | | |
|---|---|---|---|
| | Surfactant HLB | Polyalkene Concentration (ppm) | Percent Drag Reduction |
| No Surfactant | | 2.6 | 19.6 |
| with 0.4% "Triton X-15" | 3.6 | 2.7 | 22.9 |
| with 0.4% "Triton X-45" | 10.4 | 2.9 | 31.2 |
| with 0.4% "Triton X-100" | 13.5 | 2.8 | 33.4 |

Figure 2:
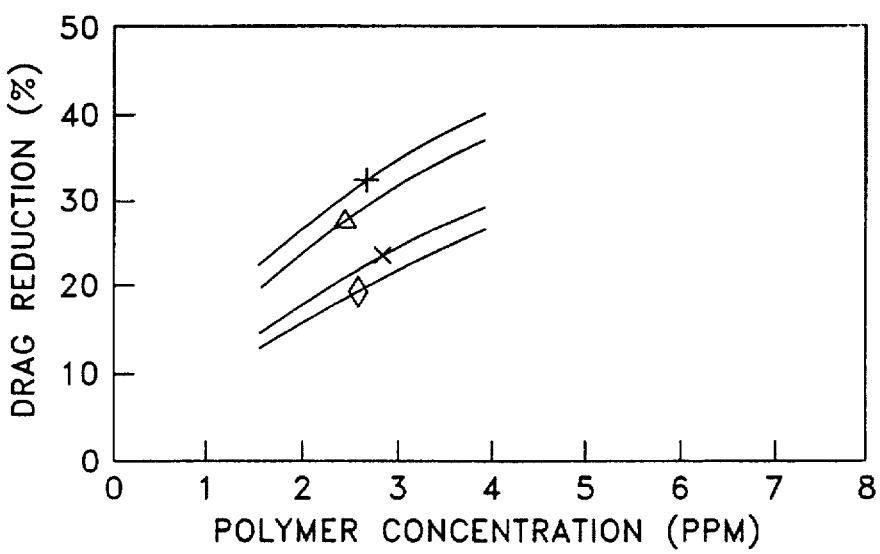
FIG. 2 is a graphical depiction of the effect of surfactants having differing HLB values on drag reduction as concentration of drag reducing polymer is increased.

Drag reduction from slurries without surfactant (as a control) and three different types of surfactants were compared. The results are summarized in FIGS. 1 and 2 of this application. These results indicate that all three surfactants improve drag reduction. Since all of the slurries were identical except for surfactant, it is believed that the difference is shown in FIGS. 1 and 2 are related to dissolution rate. Drag reduction from the slurry without surfactant was lowest, which can be attributed to less polymer in solution. Less polymer in solution within a pipeline test segment can result from slower dissolution rate. This leads to the conclusion that the polymer in a slurry with a low HLB surfactant would eventually dissolve and provide drag reduction over a longer distance, for example, even being able to pass a point of shear in a flowing stream of hydrocarbons. Table 6, preceding, shows the kinds of surfactants employed, their HLB's, the concentration of polyalkenes, and the percent of drag reduction obtained. Further information on the types of surfactants employed is found in Table 3.

While certain embodiments and details have been shown for the purpose of exemplifying the invention, it will be apparent to those skilled in the art that various changes and modifications can be made herein without departing from the spirit or the scope of the invention. For example, bulk polymerized polyalkenes were employed in some examples and much detail on their preparation has been provided, but those skilled in the art will appreciate that solution polymerized polyalkenes can also be employed, and sufficient detail has been provided to enable this.

We claim:

1. A process for improving flow of a flowing stream comprised of hydrocarbons comprising:

introducing into the stream a stable nonagglomerating suspension which comprises:

(a) water, (b) dispersed in the water, and insoluble therein, a finely divided, non-crystalline, ultra-high molecular weight, hydrocarbon soluble, polyalkene having 2 to about 30 carbon atoms per alkene precursor and an inherent viscosity of at least about 20 dL/g, and (c) surfactant having a HLB of at least about 9 in a concentration of from about 0.05 to about 1 percent by weight based on total suspension weight;

wherein the finely divided polyalkene is prepared by:

(d) combining at least one alkene containing from 2 to about 30 carbon atoms with a polymerization catalyst in the substantially complete absence of oxygen and water, (e) polymerizing the alkene at a temperature suitable for production of non-crystalline, ultra-high molecular weight polyalkene for a time sufficient to obtain such polyalkene, (f) cooling the obtained polyalkene to a cryogenic temperature, and (g) reducing the obtained polyalkene to a finely divided state at a cryogenic temperature below the glass transition temperature of the polyalkene.

2. The process of claim 1 wherein the polyalkene is prepared by bulk polymerization.

3. The process of claim 1 wherein the polyalkene is prepared by solution polymerization followed by drying.

4. The process of claim 1 wherein the stream comprised of hydrocarbons is petroleum.

5. The process of claim 1 wherein the polyalkene comprises from about 10 to about 40 percent of the total suspension weight and the surfactant comprises about 0.05 to about 1 percent of the total suspension weight.

6. The process of claim 1 wherein the suspension also comprises from about 0.5 to about 30 percent by weight of a mono- or multi-hydroxy alcohol which is substantially soluble in water.

7. The process of claim 6 wherein the alcohol has the formula R(OH)n, wherein R is an alkyl radical having 1 to about 6 carbon atoms and n is an integer of 1 to about 4.

8. The process of claim 5 wherein the surfactant has an HLB of from about 9 to about 15.

9. The process of claim 8 wherein the surfactant is selected from the group consisting of organic ammonium phosphates, ethylene oxide condensates, ethoxylated alcohols, alkyl aryl polyetheralcohols, alkylphenol hydroxypolyoxyethylenes, polyoxyethylene sorbitan monolaurate, polyethylene glycol ethers of linear alcohols and octylphenoxy polyethoxyethanol.

10. The process of claim 8 wherein the suspension additionally contains a polymeric thickening agent.

11. The process of claim 10 wherein the polymeric thickening agent is a water soluble polymeric thickening agent selected from the group consisting of guar gum, guar gum derivatives, hydroxymethyl cellulose, xanthan gums, polyacrylamides, hydroxypropyl cellulose, modified starches, and polysaccharides.

12. A stable nonagglomerating suspension suitable for improving flow of a flowing stream comprised of hydrocarbons upon introduction thereinto which comprises:

(a) water, (b) highly dispersed in the water, and substantially insoluble therein, an extremely finely divided, non-crystalline, ultra-high molecular weight, hydrocarbon soluble, undegraded, polyalkene having 2 to about 30 carbon atoms per alkene precursor and an inherent viscosity of at least about 20 dL/g, and (c) a surfactant having a HLB of at least about 9, wherein the finely divided polyalkene is prepared by:

(d) combining at least one alkene containing from 2 to about 30 carbon atoms with a polymerization catalyst in the substantially complete absence of oxygen and water (e) polymerizing the alkene at a temperature suitable for production of non-crystalline, ultra-high molecular weight polyalkene for a time sufficient to obtain such polyalkene, (f) cooling the obtained polyalkene to a cryogenic temperature, and (g) reducing the obtained polyalkene to a finely divided state at a cryogenic temperature below the glass transition temperature of the drag reducing polyalkene.

13. The suspension of claim 12 wherein the stream comprised of hydrocarbons is petroleum.

14. The suspension of claim 12 wherein the polyalkene comprises from about 10 to about 40 percent of the total suspension weight and the surfactant comprises about 0.05 to about 1 percent of the suspension weight.

15. The suspension of claim 10 wherein the alcohol has the formula R(OH)n, wherein R is an alkyl radical having 1 to about 6 carbon atoms and n is an integer of 1 to about 4.

16. The suspension of claim 14 wherein the surfactant has an HLB of from about 9 to about 15.

17. The suspension of claim 16 wherein the surfactant is selected from the group consisting of organic ammonium phosphates, ethylene oxide condensates, ethoxylated alcohols, alkyl aryl polyetheralcohols, alkylphenol hydroxypolyoxyethylenes, polyoxyethylene sorbitan monolaurate, polyethylene glycol ethers of linear alcohols and octylphenoxy polyethoxyethanol.

18. The suspension of claim 16 wherein the suspension additionally contains a polymeric thickening agent.

19. The suspension of claim 18 wherein the polymeric thickening agent is a water soluble polymeric thickening agent selected from the group consisting of guar gum, guar gum derivatives, hydroxymethyl cellulose, xanthan gums, polyacrylamides, hydroxypropyl cellulose, modified starches, and polysaccharides.

* * * * *